United States Patent
Cho et al.

(10) Patent No.: US 9,872,164 B2
(45) Date of Patent: Jan. 16, 2018

(54) METHOD FOR SETTING INTERFACE WITH MOBILITY MANAGEMENT ENTITY OF RADIO ACCESS DEVICE FOR PROVIDING SERVICES TO USER EQUIPMENT BY USING CELLULAR-BASED RADIO ACCESS TECHNOLOGY AND/OR WIRELESS LAN-BASED RADIO ACCESS TECHNOLOGY

(71) Applicant: LG ELECTRONICS INC., Seoul (KR)

(72) Inventors: Heejeong Cho, Seoul (KR); Hyeyoung Choi, Seoul (KR); Genebeck Hahn, Seoul (KR); Hyunsoo Ko, Seoul (KR); Jaehoon Chung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 68 days.

(21) Appl. No.: 14/913,950

(22) PCT Filed: Apr. 7, 2014

(86) PCT No.: PCT/KR2014/002960
§ 371 (c)(1),
(2) Date: Feb. 23, 2016

(87) PCT Pub. No.: WO2015/034153
PCT Pub. Date: Mar. 12, 2015

(65) Prior Publication Data
US 2016/0234672 A1    Aug. 11, 2016

Related U.S. Application Data

(60) Provisional application No. 61/873,799, filed on Sep. 4, 2013, provisional application No. 61/890,325, filed
(Continued)

(51) Int. Cl.
*H04W 4/00* (2009.01)
*H04W 8/02* (2009.01)
(Continued)

(52) U.S. Cl.
CPC ............. *H04W 8/02* (2013.01); *H04W 24/02* (2013.01); *H04W 28/0226* (2013.01);
(Continued)

(58) Field of Classification Search
CPC ... H04W 8/02; H04W 28/0226; H04W 40/20; H04W 84/12
(Continued)

(56) References Cited

U.S. PATENT DOCUMENTS 8,804,566 B1 * 8/2014 Singh .................... H04W 60/00
370/229
8,881,237 B2 * 11/2014 Suh ....................... H04W 12/06
380/255
(Continued)

FOREIGN PATENT DOCUMENTS

KR   1020110066744    6/2011
KR   1020110123681    11/2011
(Continued)

OTHER PUBLICATIONS

PCT International Application No. PCT/KR2014/002960, International Search Report, dated Jun. 27, 2014, 4 pages.

*Primary Examiner* — Chi H Pham
*Assistant Examiner* — Alexander O Boakye
(74) *Attorney, Agent, or Firm* — Lee Hong Degerman Kang & Waimey

(57) ABSTRACT

According to one embodiment of the present specification, provided is a method for setting an interface between a radio access device for providing services to user equipment (UE) by using cellular-based radio access technology (RAT) and/
(Continued)

or wireless LAN-based RAT, and a mobility management entity (MME). The method can comprises the steps of: transmitting, by the radio access device, a request message to the MME; and receiving a response message from the MME.

14 Claims, 23 Drawing Sheets

Related U.S. Application Data on Oct. 14, 2013, provisional application No. 61/894,429, filed on Oct. 23, 2013, provisional application No. 61/950,192, filed on Mar. 9, 2014.

(51) Int. Cl.
*H04W 24/02* (2009.01)
*H04W 28/02* (2009.01)
*H04W 40/20* (2009.01)
*H04W 92/14* (2009.01)
*H04W 84/12* (2009.01)
*H04W 88/10* (2009.01)

(52) U.S. Cl.
CPC ............ *H04W 40/20* (2013.01); *H04W 84/12* (2013.01); *H04W 88/10* (2013.01); *H04W 92/14* (2013.01)

(58) Field of Classification Search
USPC .......................................................... 370/338
See application file for complete search history.

(56) References Cited

U.S. PATENT DOCUMENTS

| | | | | |
|---|---|---|---|---|
| 2006/0198361 | A1* | 9/2006 | Chen | H04W 88/08 370/352 |
| 2012/0079084 | A1* | 3/2012 | Forssell | H04W 8/18 709/221 |
| 2012/0263145 | A1 | 10/2012 | Marinier et al. | |
| 2012/0275401 | A1* | 11/2012 | Sun | H04W 72/04 370/329 |

FOREIGN PATENT DOCUMENTS

| | | |
|---|---|---|
| KR | 1020110124710 | 11/2011 |
| WO | 2013048201 | 4/2013 |

* cited by examiner

METHOD FOR SETTING INTERFACE WITH MOBILITY MANAGEMENT ENTITY OF RADIO ACCESS DEVICE FOR PROVIDING SERVICES TO USER EQUIPMENT BY USING CELLULAR-BASED RADIO ACCESS TECHNOLOGY AND/OR WIRELESS LAN-BASED RADIO ACCESS TECHNOLOGY

CROSS-REFERENCE TO RELATED APPLICATIONS

This application is the National Stage filing under 35 U.S.C. 371 of International Application No. PCT/KR2014/002960, filed on Apr. 7, 2014, which claims the benefit of U.S. Provisional Application No. 61/873,799, filed on Sep. 4, 2013, 61/890,325, filed on Oct. 14, 2013, 61/894,429, filed on Oct. 23, 2013 and 61/950,192, filed on Mar. 9, 2014, the contents of which are all hereby incorporated by reference herein in their entirety.

BACKGROUND OF THE INVENTION

Field of the Invention
The present disclosure relates to mobile communications.
Related Art
3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. Multiple Input Multiple Output (MIO) having up to four antennas is employed. Recently, 3GPP LTE-Advanced (LTE-Advanced) which has evolved from 3GPP LTE is widely used.

FIG. 1 Shows the Configuration of an Evolved Mobile Communication Network.

As illustrated, an evolved UMTS terrestrial radio access network (E-UTRAN) is connected to an evolved packet core (EPC).

The E-UTRAN includes a base station (BS) (or eNodeB) 20 which provides a control plane and a user plane to a User Equipment (UE). The BSs (or eNodeBs) 20 may be interconnected by means of an X2 interface.

Layers of a radio interface protocol between the UE and the BS (or eNodeB) 20 can be classified into a first layer (L1), a second layer (L2), and a third layer (L3) based on the lower three layers of the Open System interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Meanwhile, the EPC may include various constitutional elements. Among them, a mobility management entity (MME) 51, a serving gateway (S-GW) 52, a packet data network gateway (PDN GW) 53, and a home subscriber server (HSS) 54 are illustrated in FIG. 1.

The BS (or eNodeB) 20 is connected to the MME 51 of the EPC through an S1 interface, and is connected to the S-GW 52 through S1-U.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

Meanwhile, high-speed data traffic is dramatically increasing. In order to deal with the increasing traffic, technologies for offloading traffic from UE to a Wireless Local Area Network (WLAN) (or Wi-Fi) or a small cell have been introduced.

FIG. 2 Shows the Configuration of a Small Cell and an Additional Network which are Used to Deal with an Increase in Data Traffic of UE.

With reference to FIG. 2, a plurality of WLAN Access Point (AP)s may be arranged in the coverage of a small cell BS 31. That is, various Radio Access Technologies (RATs) may exist around an UE. Accordingly, the UE is capable of distribute data traffic to the various RATs. The small cell BS 31 may be arranged in the coverage of a macro BS, such as an existing eNodeB.

As illustrated in FIG. 2, the P-GW 53 and the HSS 54 are connected to an access authentication authorization (AAA) server 56. The ePDG 57 acts as a security node for a unreliable non-3GPP network (for example, WLAN, WiFi, or the like). The ePDG 57 may be connected to a WLAN access gateway (WAG) 58. The WAG 58 may act as a P-GW in a Wi-Fi system.

However, if a WLAN AP is added, an EPC may have a very complicated structure.

Alternatively, a user may want to use resources in his/her home network (for example, at work or at home), regardless of which WLAN AP is an accessed AP. Such a user need may be satisfied through Mobile-IPv6.

FIG. 3 Shows an Example of Bypassing a Home Network Through Mobile-IPV6.

As noted with reference with FIG. 3, a mobile IP terminal may be generated between a home agent (HA) and a remote agent (RA) in order to enable a UE 10 to access resources within a home network or to access an external network even though the UE 10 out of the home network is on a visited network 1 or on a visited network 2. FIG. 3 illustrates a case where each agent is included in a WLAN AP in each network, but aspects of the present disclosure are not limited thereto, so each agent may exist independently.

Suppose that a subnet of the home network is 10.1.1.0, that a subnet of the visited network 1 is 20.1.1.0, and that a subnet of the visited network 2 is 30.1.1.0, it is possible to use an IP address of the home network (for example, 10.1.1.1), regardless of where the UE 10 is located. To this end, The UE 10 may transmit a control message, e.g., a registration message, to a home agent (HA) to notify a location of the UE 10. Then, a mobile IP tunnel may be generated between the HA and the RA, and care of address (COA) may be performed through the mobile IP tunnel.

However, this technique may lead to a prolonged delay.

FIG. 4 shows a case in which UE#A existing in an external network (EN) transmits data to UE#B. Here, UE#B receives the data by using the cellular-based RAT and the WLAN-based RAT.

In a case where UE#B receives the data with the cellular-based RAT, an end-to-end delay between UE#B may be defined as below:

E2E Delay=$PD_{EN}+PD_{HN}+PD_{BN\_A}$

Here, $PD_{EN}$ denotes a packet delay in an external network, $PD_{HN}$ denotes a packet delay in a home network, and $PD_{BN\_A}$ denotes a packet delay in backbone A.

In a case where UE#B receives the data by using the WLAN-based RAT, an end-to-end delay between UE#A and UE#B may be defined as below:

E2E Delay=$PD_{EN}+PD_{VN}+PD_{BN\_A}+PD_{BN\_B}$

Here, $PD_{VN}$ denotes a packet delay in a visited network, and $PD_{BN\_B}$ denotes a packet delay in backbone B.

As noted with the above equation, if UE#B receives the data by using the WLAN-based RAT which is the visited network, a further delay of $PD_{BN\_B}$ occurs.

To solve the delay problem, existing optimization schemes may be used. The existing optimization schemes may be summarized as in the following table:

TABLE 1

| Type of Scheme | Characteristics | Drawbacks | |
|---|---|---|---|
| Client Controlled Mobility Protocol (MIPv6) | A HA transmits biding information on a home address and a remote address of a receiver UE (UE#B in FIG. 4) to a transmitter UE (UE#A in FIG. 4) | Complexity in embodiment of a terminal, and increase in power consumption Increase in L3 signaling overheads for updating binding relative to CN due to movement of a terminal | $Overhead_{MIPv6} = M * C * N_{CN} * (O_{AN} + O_{BN})$ |
| Network Controlled Mobility Protocol (PMIPv6) | A HA transmits biding information on a home address and a remote address of a UE to a relay agent (a gateway) | Being requested by a special-purpose relay agent An increase of L3 signaling overheads for updating biding between relay agents due to movement of a terminal | $Overhead_{PMIPv6} = M * C * N_{RA} * O_{BN}$ |
| Integrated Web cache | Store, in a relay server, contents frequently searched by users | A need of a special-purpose gateway which has an additional web cash function In response to a request for non-cashed contents, a transmission delay still occurs | |

In the above table, M denotes the number of times of movement, and C is 2, which is the number of transmission and receipt of binding information. $N_N$ denotes the number of devices in which connection for data communications is set, and $N_{PA}$ denotes the number of relay agents.

In addition, $O_{AN}$ denotes a sum of overheads in access networks of UE, and $O_{BN}$ denotes a sum of overheads in backbone networks.

As noted with reference to the above table, the existing optimization techniques are advantageous in reducing a delay, but possibly cause an increase in overheads. Thus, there is a need for a scheme which enables reducing a delay without an additional overhead.

An embodiment of the present specification aims to provide a solution of a complex structure of an evolved packet core (EPC), which is led by addition of an Wireless Local Area Network (WLAN).

In addition, another embodiment of the present specification aims to provide a solution for reducing a delay without an additional overhead.

SUMMARY OF THE INVENTION

According to an embodiment of the present specification for the aforementioned objectives, In order to achieve the aforementioned object, one disclosure of the specification provides a method for setting an interface between a mobility management entity and a wireless access device. The method may comprise: transmitting a request message to the mobility management entity which provides services using either or both of a cellular-based Radio Access Technology (RAT) and a Wireless Local Area Network (WLAN)-based RAT to a user equipment (UE); and receiving a response message from the mobility management entity. Here, the request message may comprise identifier (ID), type information, and information on mobility capability of the radio access device.

The type information may indicates one of the following: a first type providing only the cellular-based RAT; a second type providing both of the cellular-based RAT and the WLAN-based RAT; a third type providing the cellular-type RAT, and having an interface with a WLAN Access Point (AP); and a fourth type providing both of the cellular-based RAT and the WLAN-based RAT, and having an interface for an external WLAN AP.

If the wireless access device provides the WLAN-based RAT, the request message may further include WLAN settings.

The WLAN settings may comprise at least one of the following: information on a number of wireless APs managed by the radio access device, an index of a corresponding AP, and information on mobility capability of the corresponding AP.

If the request message is transmitted to update the WLAN settings, the request message may comprise an index of an AP to be updated, and updated information.

The index of a corresponding AP may be represented by a combination of ID of the corresponding AP and an attribute which indicates whether the corresponding AP is managed by a single wireless access device or a plurality of radio access devices.

If the information on mobility capability of the wireless access device indicates that the wireless access device is able to move, the request message may further comprise information indicating that a moving direction is forward or reverse, and information of a Wireless Backhaul Router (WBR).

The information on mobility capability of the wireless access device may indicate that the wireless access device is able to move, the request message further comprises a Tracking Area (TA) list.

The information on mobility capability of the wireless access device may indicate that the wireless access device is able to move, the response message comprises a TA list generated by the mobility management entity.

If the response message comprises the TA list, the method may further comprise broadcasting the TA list to one or more terminals via system information.

In order to achieve the aforementioned object, one disclosure of the specification provides a wireless access device for providing services using either or both of a cellular-based Radio Access Technology (RAT) and a Wireless Local Area Network (WLAN)-based RAT to User Equipment (UE). The wireless access device may comprise: a transceiver; and a controller configured to control the transceiver to transmit a request message to a mobility management entity, and to receive a response message from the mobility management entity. Here, the request message may comprise identifier (ID), type information, and information on mobility capability of the radio access device.

According to an embodiment of the present disclosure, a wireless access device providing a service to User Equipment (UE) by using at least one of a cellular-based radio access technology (RAT) and a wireless-based RAT is enabled to perform interfacing with respect to a mobility management entity (MME), so that a evolved packet core (EPC) may have a simple structure.

DESCRIPTION OF EXEMPLARY EMBODIMENTS

Figure 1:
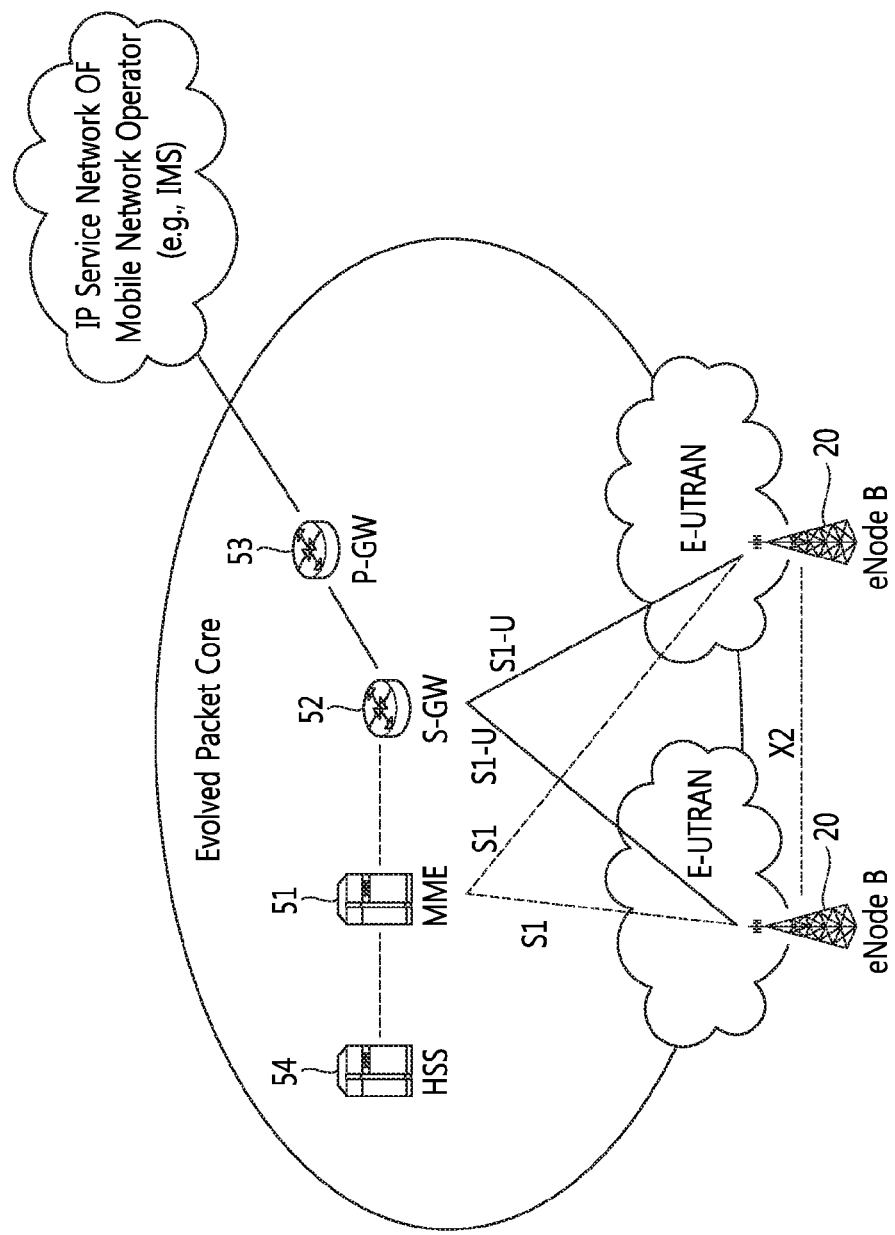
FIG. 1 shows a structure of an evolved mobile communication network.
Figure 2:
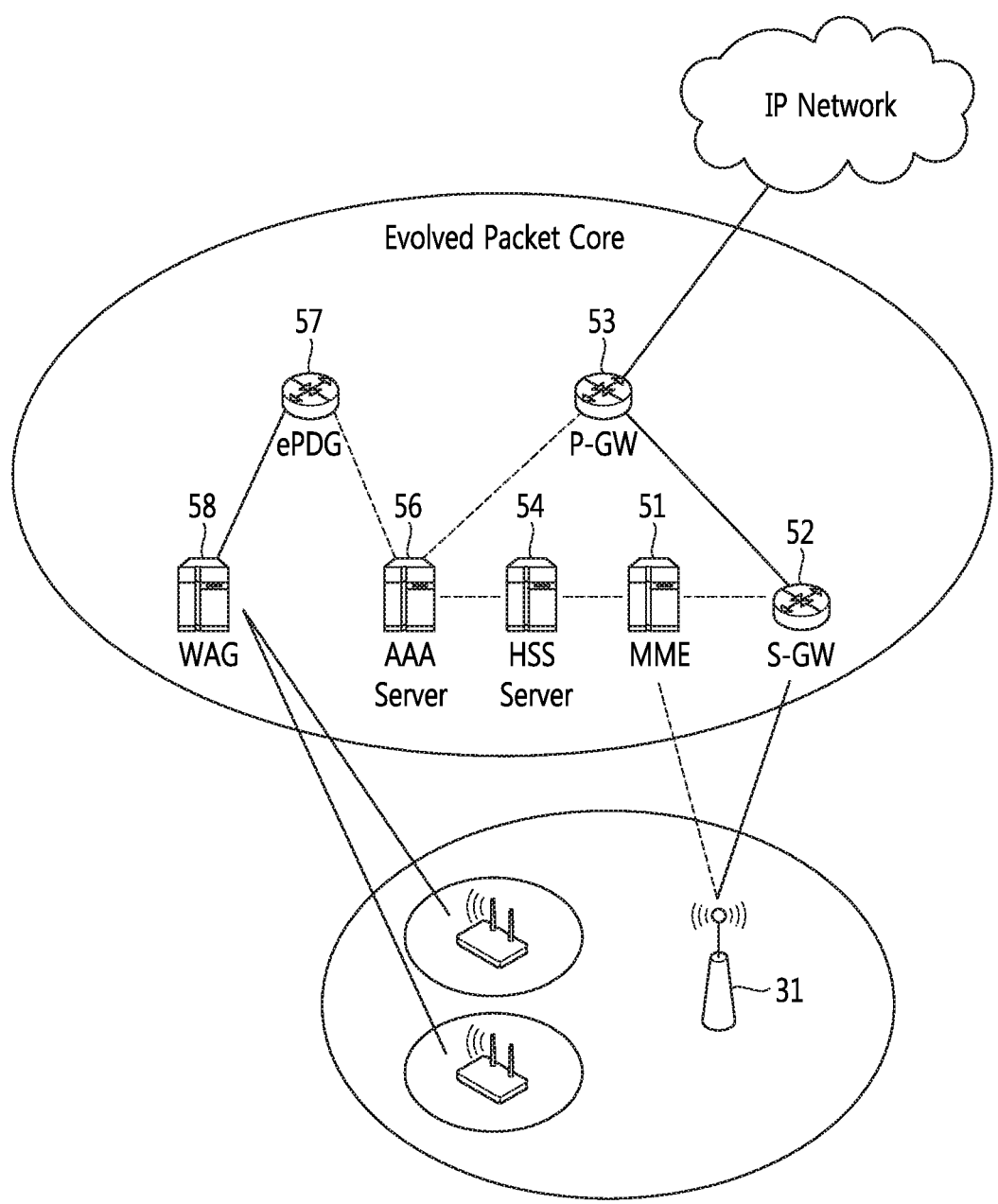
FIG. 2 shows a structure of a network in which a small cell and a Wireless Local Area Network (WLAN) Access Point (AP) are added to deal with an increase of data traffic of User Equipment (UE).
Figure 3:
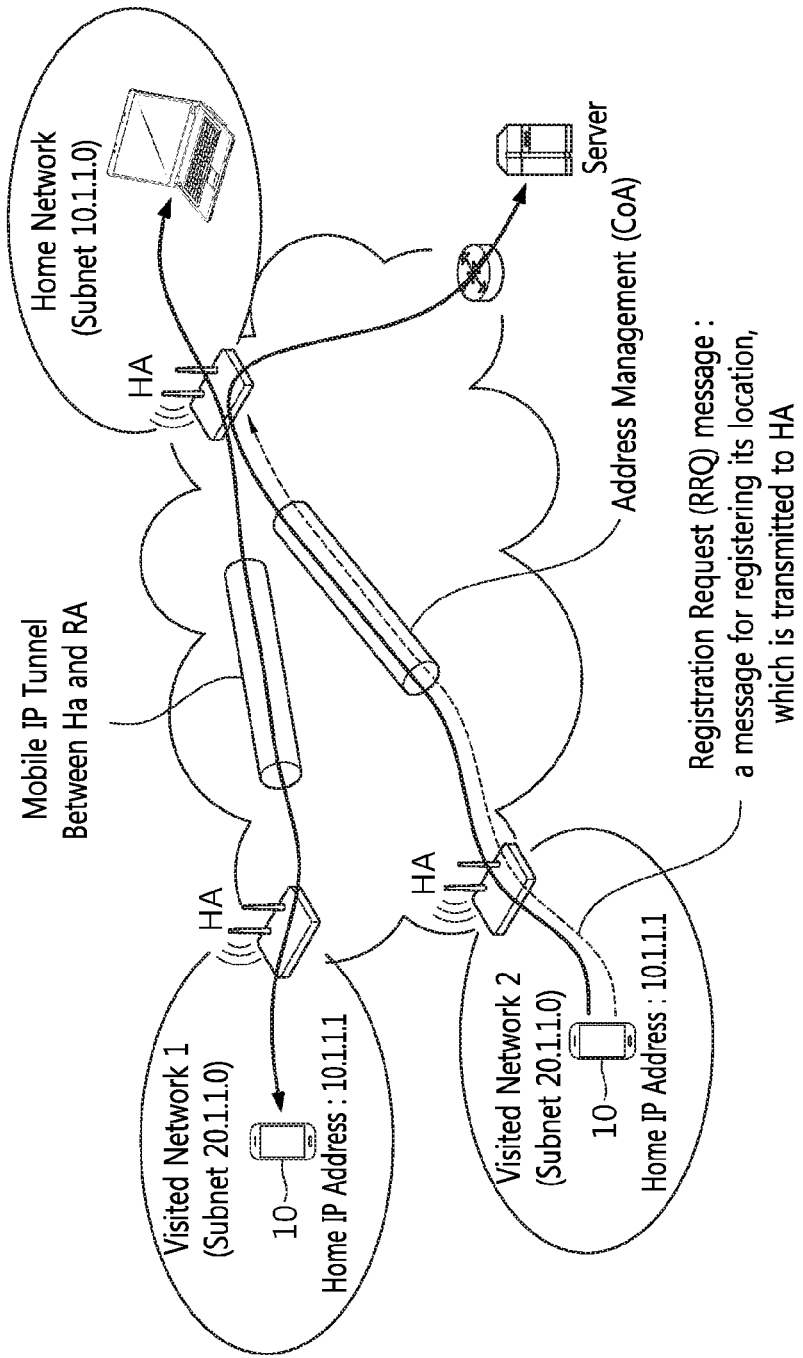
FIG. 3 shows an example of bypassing a home network with Mobile-IPV6.
Figure 4:
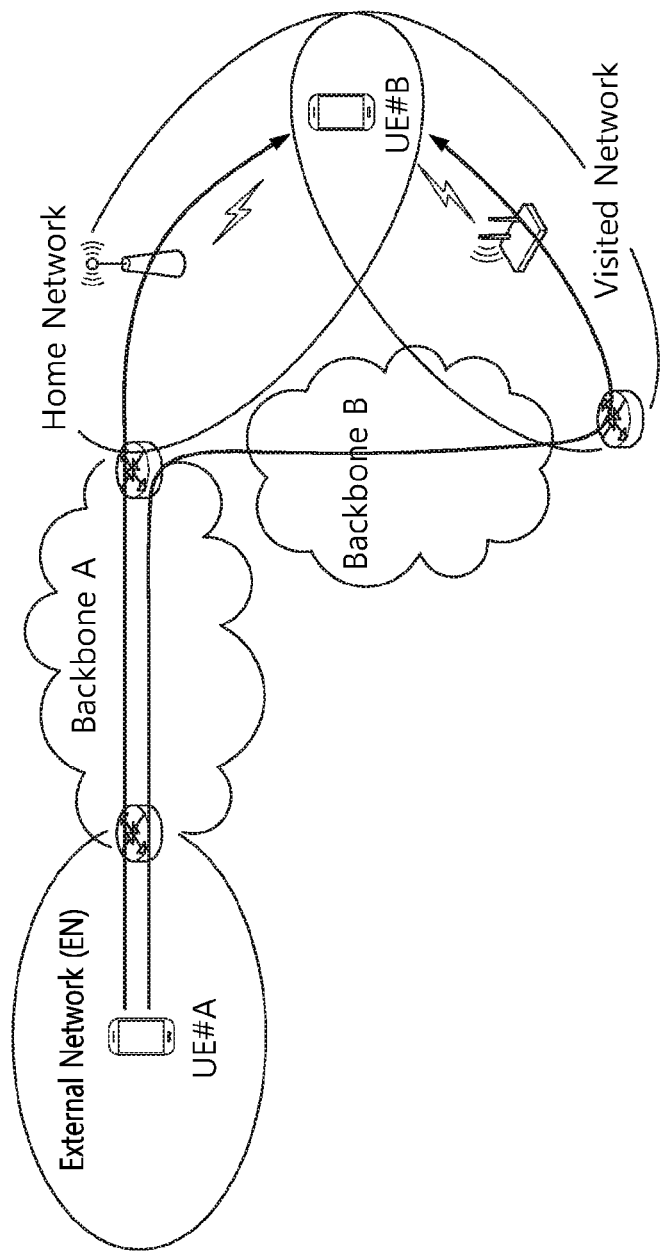
FIG. 4 shows a case where a delay is further prolonged.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the accompanying drawings, User Equipment (UE) is illustrated as an example, but the illustrated UE may also be named a term, such as a terminal or Mobile Equipment (ME). Furthermore, the UE may be a portable device, such as a laptop computer, a mobile phone, a PDA, a smart phone, or a multimedia device, or a non-portable device, such as a PC or a device mounted on a vehicle.

Figure 5:
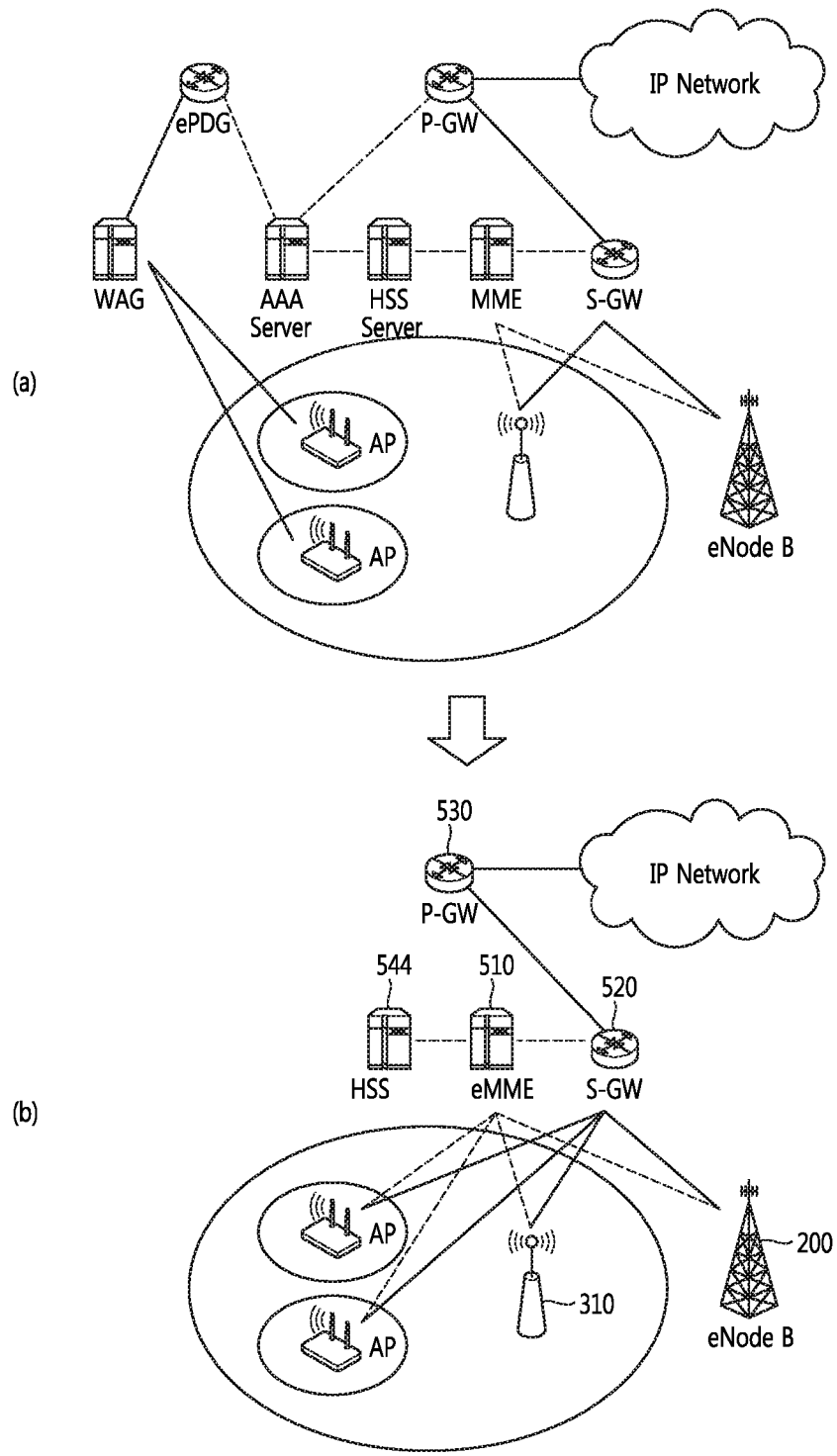
FIG. 5 is a diagram showing exemplary comparison between an existing mobile communication network structure and an improved network structure according to an embodiment of the present disclosure.

FIG. 5 is a Diagram Showing Exemplary Comparison Between an Existing Mobile Communication Network Structure and an Improved Network Structure According to an Embodiment of the Present Disclosure.

In FIG. 5, (a) is an existing mobile communication network structure, and (b) is an improved network structure. With reference to (b) in FIG. 5, the improved network structure may include an enhanced mobility management entity (eMME) 510, and an enhanced gateway (eGW) 520. Although the eMME 510 and the eGW are separate in (b) in FIG. 5, they may be logically separate, but physically integrated into one device. In addition, although the eGW 520 and a packet data network gateway (P-GW) 530 are separate in (b) in FIG. 5, they may be integrated into one device.

The eMME 510 may be connected not only to an eNodeB 200 and a small cell base station (BS) 310, but also to a Wireless Local Area Network (WLAN) Access Point (AP). To this end, a new interface may be added between the eMME 510 and the WLAN AP. Similarly, the eGW 520 may be connected not only to the eNodeB 200 and the small cell BS 310, but also to the WLAN AP. To this end, a new interface may be added between the eGW 520 and the WLAN AP.

FIGS. 6A to 6D are Conceptual Diagrams Illustrating a RE which Integratedly Manages a BS and a WLAN AP for a Multi-RAT UE According to an Embodiment of the Present Disclosure.

An RE (or a radio access device) 300 is a device that is newly proposed according to an embodiment of the present disclosure and makes it easy to manage the BS 310 and an WLAN AP 320 to enhance the support for a multi-RAT UE 100. According to an embodiment of the present disclosure, there may be various types of the aforementioned RE.

Figure 6A:
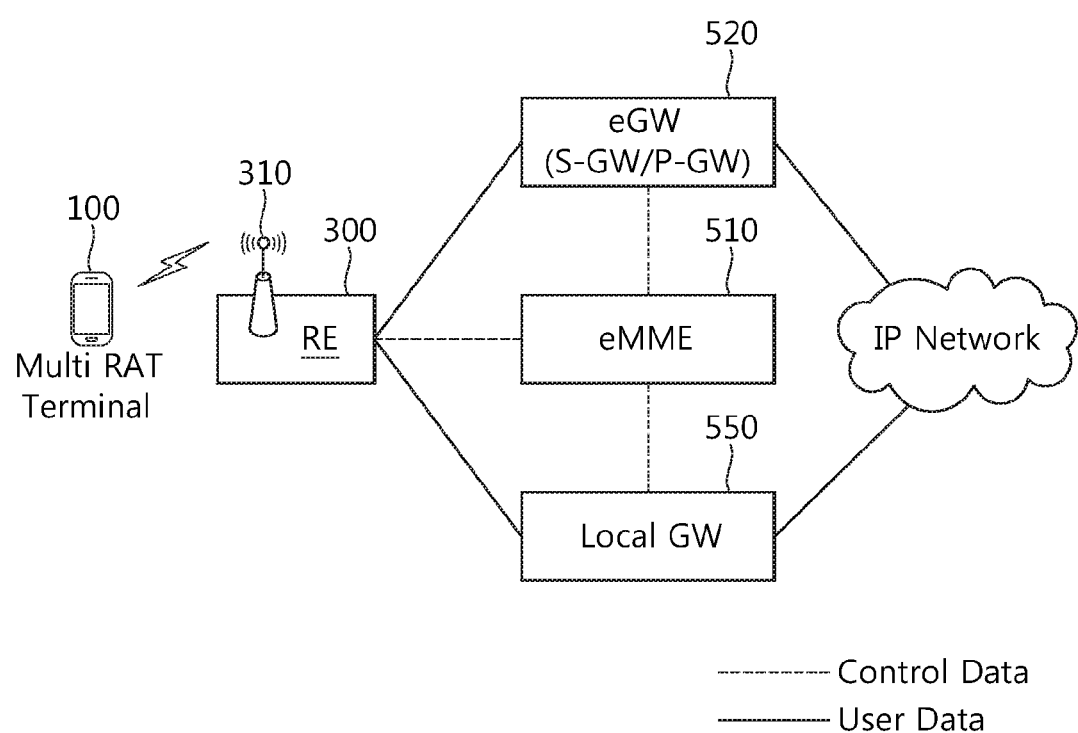
FIGS. 6A to 6D are conceptual diagrams illustrating a Radio Entity (RE) which integratedly manages a base station (BS) and a WLAN AP for a RAT UE according to an embodiment of the present disclosure.

FIG. 6A shows a concept of a first-type RE. A first-type RE 300 supports only a cellular BS (e.g., a small cell BS) 310. Here, the first-type RE 300 may be integrated into the cellular BS (e.g., a small cell BS) 310. The first-type RE 300 is connected to the eGW 520 and a local GW 550 for transmission and receipt of user data, and connected to the eMME 510 for transmission and receipt of control data. The eGW 520 may perform at least one of a S-GW function and a P-GW function. The local GW 520 is a gateway that enables access to a home network at home or at work.

Figure 6B:
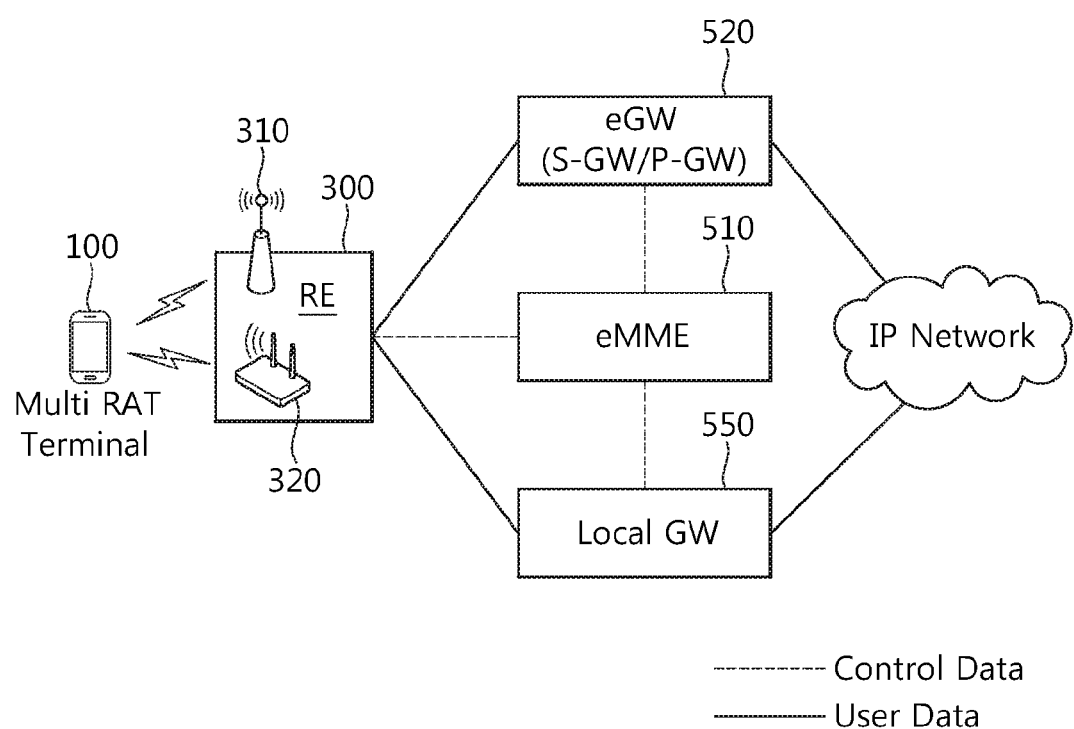

FIG. 6B shows a concept of a second-type RE. A second-type RE 300 supports both of a cellular BS (e.g., a small cell BS) 310 and a WLAN AP 320. Here, the second-type RE 300 may be a device that integrates the cellular BS (e.g., a small cell BT) 310 and the WLAN AP 320.

Figure 6C:
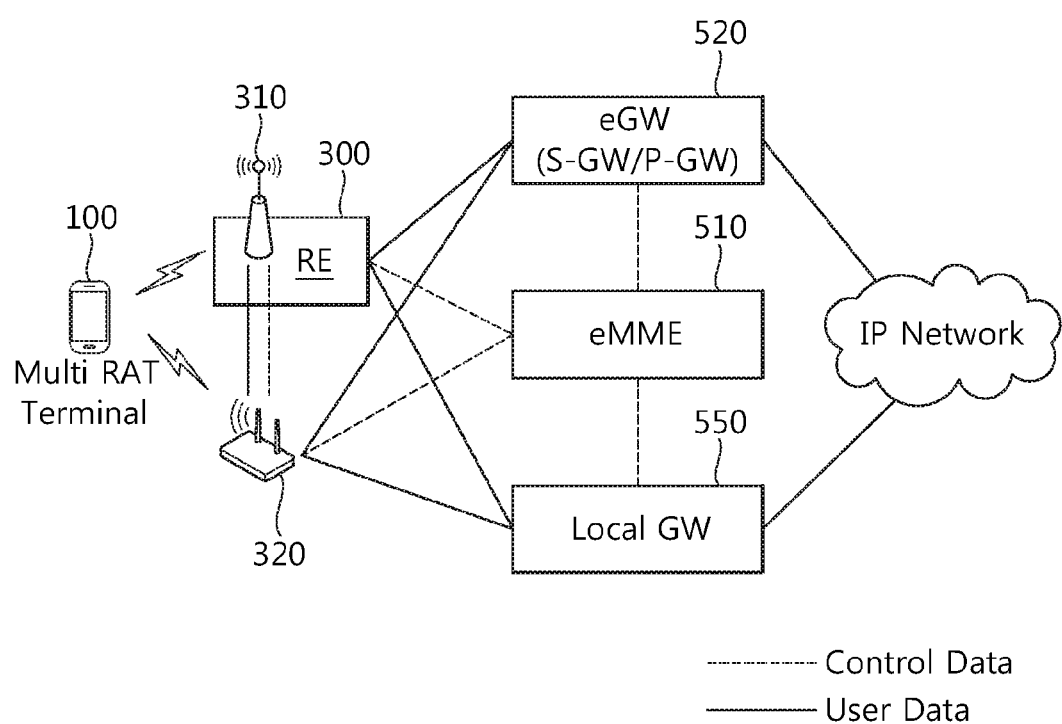

FIG. 6C shows a concept of a third-type RE. A third-type RE 300 is integrated into a cellular BS (e.g., a small cell BS) 310, and an interface with an WLAN AP 320 exists.

Figure 6D:
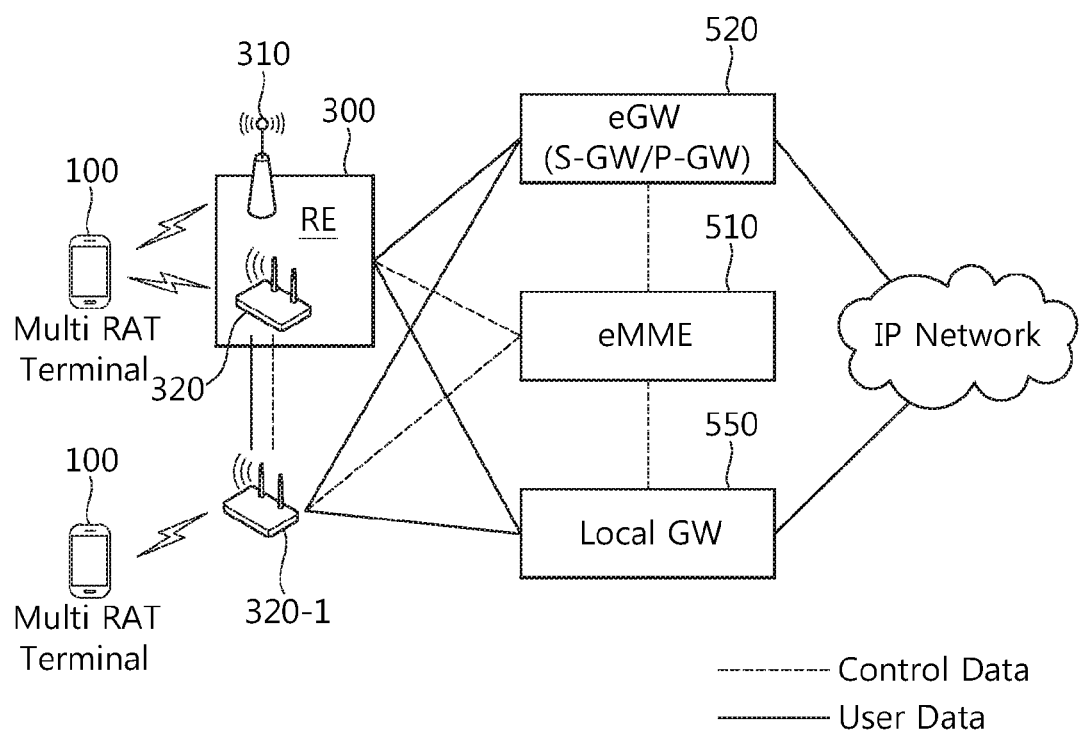

FIG. 6D shows a concept of a fourth-type RE. A fourth-type RE 300 is a concept of mixture of the second-type RE and the third-type RE. That is, the fourth-type RE 300 is a device which integrates a cellular BS (e.g., a small cell BS 310 and a WLAN AP 320, and an interface with an external AP 320-1 further exists.

The above-described first to fourth-typed Res may be used according to the number of cellular BSs and the number of WLAN APs, as shown in the following table:

TABLE 2

| Number of Cellular BSs | Number of APs | Type of RE | Applicable Scenario |
| --- | --- | --- | --- |
| 1 | 1 | Second Type Third Type | Small Cell Coverage |
| 1 | N | Second Type Third Type Fourth Type | Macro Cell Coverage |
| N | 1 | Second Type or Third Type | Use of X2 Interface |
| N | N | Fourth Type | |

Figure 7A:
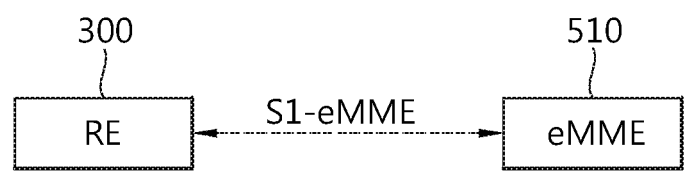
FIG. 7A shows an interface between an RE and an eMME.
Figure 7B:
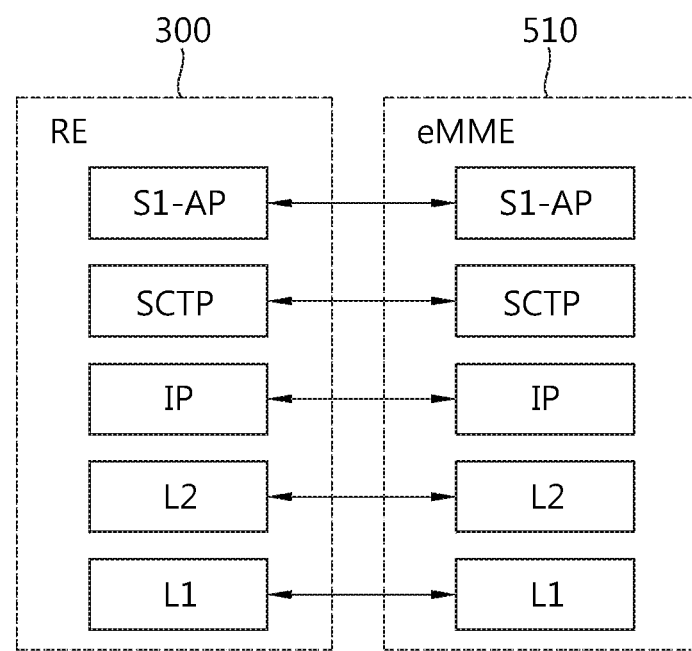
FIG. 7B shows a protocol spec between the RE and the eMME.

FIG. 7A Shows an Interface Between an RE and an eMME, and FIG. 7B Shows a Protocol Spec Between an RE and an eMME.

As noted with reference to FIG. 7A, a new S1-eMME interface may be defined between an RE 300 and an eMME 510 according to an embodiment of the present disclosure.

As noted with reference to FIG. 7B, the new S1-eMME interface between RE 300 and the eMME 510 may include at least one of L1, L2, L3(IP), SCTP (Stream Control Transmission Protocol), and S1-AP.

Figure 8A:
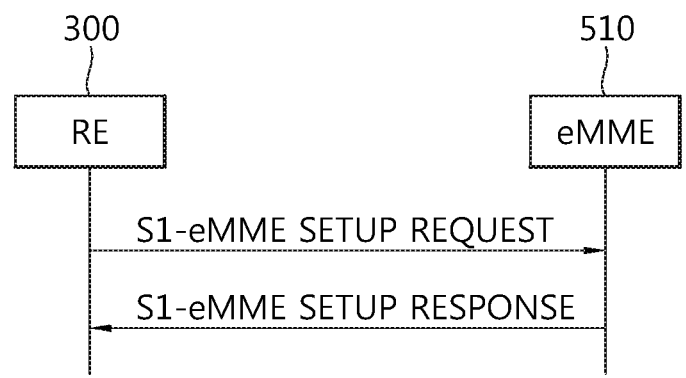
FIGS. 8A to 8D show messages exchange between an RE and an eMME.
Figure 8B:
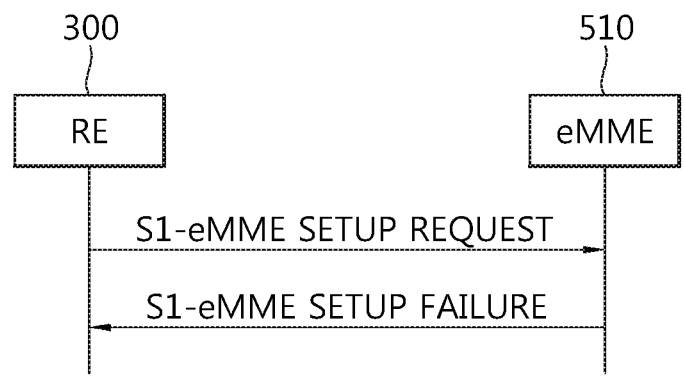
Figure 8C:
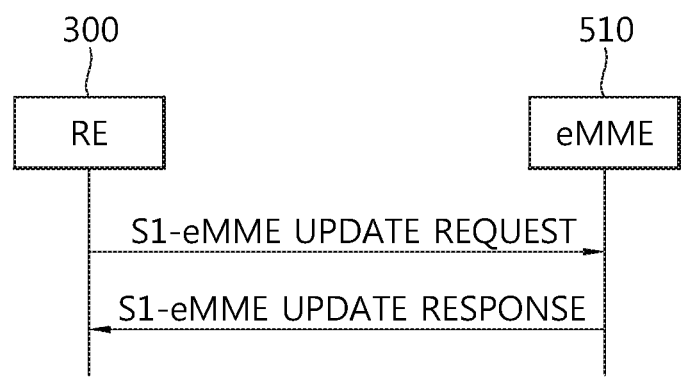
Figure 8D:
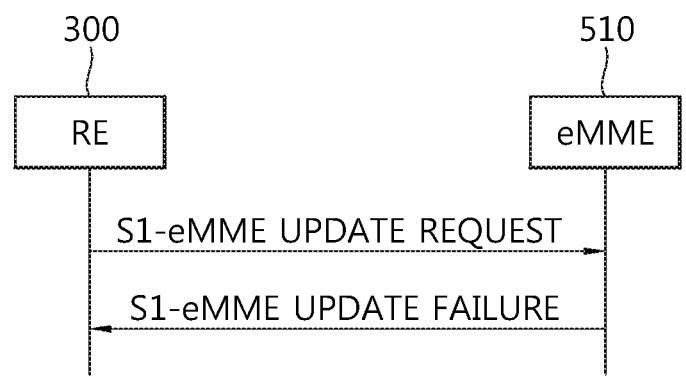
Figure 8E:
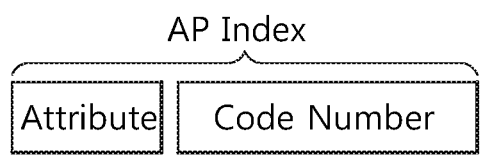
FIG. 8E shows a structure of an AP index.

FIGS. 8A to 8D shows messages exchanged between an RE and an eMME, and FIG. 8E shows a structure of an AP index.

As illustrated in FIG. 8A, a procedure for setting the S1-eMME interface between an RE 300 and an eMME 510 may be initiated by the RE 300. That is, in order to initiated the aforementioned procedure, the RE 300 may transmit a setup request message (e.g., a S1-eMME SETUP REQUEST). In response to the receipt of the setup request message, the eMME 510 may transmit a setup response message (e.g., a SI-eMME SETUP RESPONSE).

The procedure for setting the S1-eMME interface triggers deletion of setting data of an existing application. In addition, the procedure for setting the S1-eMME interface renders UE-related context initialized and removes every signaling connection between the RE 300 and eMME 510.

Exchanged data may be stored in each of the RE 300 and the eMME 510.

The setup request message (e.g., S1-SETUP REQUEST) may include a message type field and an RE setting information field. The RE setting information field may include elements described in the following table. Here, in a case where a entity in charge of managing Wi-Fi information is not a core network entity (e.g., an eMME), the RE setting information field may include only basic elements, such as the number of APs managed by an RE, an AP index, identifier (ID), and power state (on/off), and mobility capability.

TABLE 3

| Element | Descriptions |
| --- | --- |
| Global RE ID | Unique ID of an RE |
| Supported Tracking Area | Showing a supported Tracking Area (TAC, PLMN ID) |
| Type of RE | Showing at least one of the first type, the second type, the third type, and the fourth type |
| Mobility Capability of RE | Mode 1: fixed RE<br>Mode 2: mobile RE |
| Wi-Fi Settings | Information on at least one AP managed by the RE<br>the number of APs<br>AP index<br>AP ID: IP address, SSID, BSSID, HESSID<br>whether only limited users are allowed to use:<br>Openness/Closeness (Public, Private, Personal)<br>frequency channel: operating class, channel number<br>Beacon-related information: beacon period<br>information about loads, interruption, and a<br>power state (on/off, intensity)<br>Mobility Capability: fixed/mobile |

Among elements shown in the above table, the Wi-Fi setting element may not be included in the setup request message (e.g., S1-eMME SETUP REQUEST) in a case where a type of an RE is the first type.

The setup response message may include a message type field and an eMME ID field. The eMME ID field may include at least one of PLMN ID, eMME group ID, and an eMME code.

As illustrated in FIG. 8B, in response to the setup request message (e.g., S1-eMME SETUP REQUEST) of the RE 300, the eMME 510 may transmit a setup failure message (e.g., S1-eMME SETUP FAILURE). The setup failure message may include both of a message type field and a cause field. The cause field may show a cause value indicative of why the setup has failed.

As noted with reference to FIG. 8C, the RE 300 may transmit a update request message (e.g., S1-eMME UPDATE REQUEST) to initiate a update procedure, in a case where it is necessary to update application level setting information that is needed to properly execute the S1-eMME interface. In response to the update request message, the eMME 510 may transmit a update response message (e.g., S1-eMME UPDATE RESPONSE).

The update request message may include a message type field, and an RE setting information field. The RE setting information field may include only an element which is requested to be updated among the elements shown in Table 3. For example, in a case where RE setting information requested to be updated is Wi-Fi settings, only the Wi-Fi setting element may be included in the RE setting information field of the update request message. Here, the Wi-Fi setting element to be updated may include an AP index in order to indicate a target Wi-Fi AP. Here, to show whether the element requested to be updated is addition, modification, or deletion of information, action code ADD, MODIFY, and DELETE may be included.

As illustrated in FIG. 8D, in response to the update request message of the RE 300, the eMME 510 may transmit an update failure message (e.g., S1-eME UPDATE FAILURE). The update failure message may include a message type field and a cause field. The cause field may show a cause value indicative of why the update has failed.

As illustrated in FIG. 8E, an AP index may include an attribute and a code number. The attribute may be set as 1 if a corresponding AP is managed by a single RE, and may be set as 1 if the corresponding AP is managed by multiple REs. The code number indicates unique ID of the corresponding AP.

Examples of the setup request message and the update request message may be explained as follows:

For example, in a case where an RE is the second type and fixed, an RE setting information field of the setup request message or the update request message may include elements shown in the following table:

TABLE 4

| Element | Settings |
| --- | --- |
| Type of RE | Second Type |
| Mobility Capability of RE | Fixed |
| Wi-Fi Settings | the number of APs: 1<br>AP index: 1<br>AP ID: IP address (192.168.1.4), SSID (LG), BSSID (56.56.55 65.44)<br>whether only a limited user are allowed to use: openness<br>Beacon-related information: 10 ms<br>Mobility: Fixed |

In Table 4, the RE is the second type and thus a corresponding AP is able to use the IP address of the RE, so that an IP address of the AP may be omitted. In addition, since the RE is the second type and fixed, the corresponding AP is also fixed.

Meanwhile, although an AP index is included in the Wi-Fi setting element, an eMME may re-allocate a different AP index. If the eMME re-allocate the different AP index, the previous AP index and the re-allocated AP index may be included in a setup response message or a update response message to be transmitted. Alternatively, if an AP index is not included in the Wi-Fi setting element, the eMME may include ID of the corresponding AP and an allocated AP index.

In another example, if the RE is the fourth type and fixed, an RE setting information field of the setup request message or the update request message may include elements shown in the following table:

TABLE 5

| Element | Settings |
| --- | --- |
| Type of RE | Fourth Type |
| Mobility Capability RE | Fixed |
| Wi-Fi Settings | the number of APs: 2<br>the number of integrated inner WLAN APs: 1<br>AP index: 2<br>AP ID: IP address (192.168.1.1), SSID (LG), BSSID (56.56.55 65.44)<br>whether only a limited user is allowed to user: Openness<br>Beacon-related information: 10 ms<br>Mobility: Fixed<br>AP Index: 84<br>AP ID: IP address (192.168.1.2), SSID (LG), BSSID (50.BD.73 E2.C0)<br>Whether only a limited user is allowed to user: Openness<br>Beacon-related information: 10 ms<br>Mobility: Mobile |

Figure 9A:
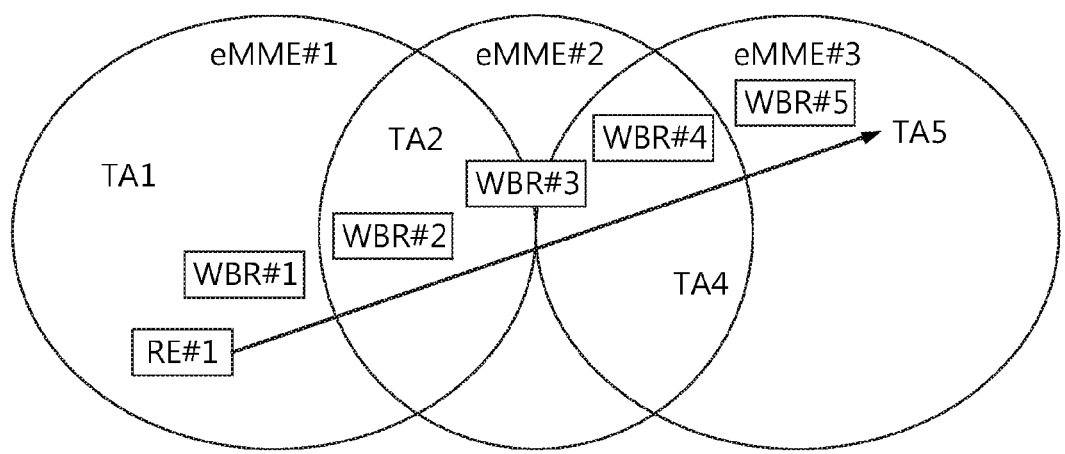
FIGS. 9A to 9B show examples of a mobile RE.
Figure 9B:
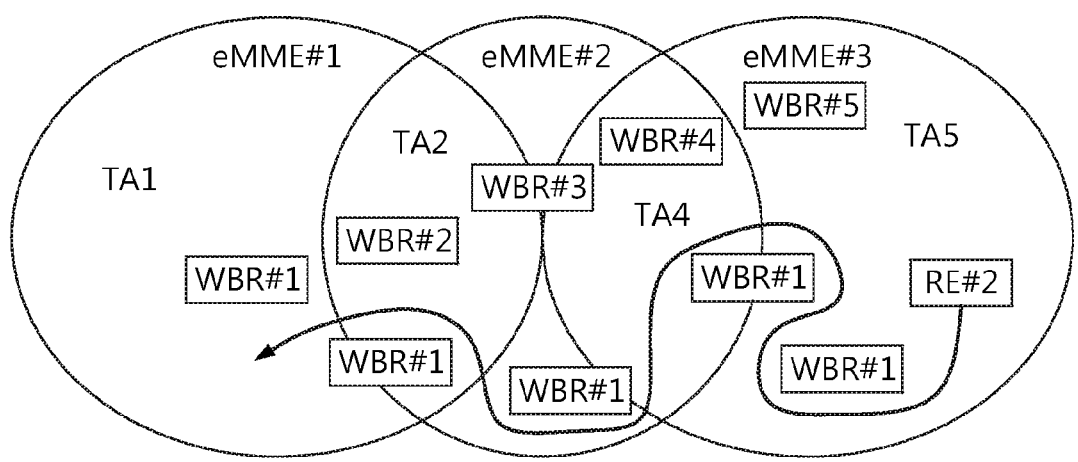

FIGS. 9A and 9B Show Examples of a Mobile RE.

As noted with references to FIGS. 9A and 9B, an RE may be able to move.

Specifically, as illustrated in FIG. 9A, there may be RE#1 which moves along a predetermined path. This situation considers a possibility that RE#1 is installed in a bus or a subway. Thus, in this case, it is possible to set a tracking area (TA) in advance. That is, in the example shown in FIG. 9A, an forward sequence of TA1, TA2, TA4, and TA5 or a reverse sequence of TA5, TA4, TA2, and TA1 may be predetermined.

Alternatively, as shown in FIG. 9B, there may be RE#2 which freely moves without a predetermined path. This situation considers a possibility that RE#2 is installed in a taxi or a personal vehicle. Thus, in this case, it is not possible to set a TA in advance.

Since an RE is able to move as described above, an embodiment of the present disclosure suggests introduction of a Wireless Backhaul Router (WBR). The WBR will be described with reference to FIGS. 10A and 10B.

With introduction of the WBR, it is necessary to add additional elements to a setup request message and a setup response message, which are shown in FIG. 8A.

For example, in a case where RE#1 moves along a specific path, as illustrated in FIG. 9A, a setup request message shown in FIG. 8A may include an element indicative of a TA list (TA1, TA2, TA3, TA4, and TA5), a elements indicative of an RE moving direction (forward/reverse), and an element indicative of ID of a serving WBR. At this time, the setup response message shown in FIG. 8A may include an element of a TA list managed by the eMME. For example, if the TA list managed by the eMME includes TA1, TA3, and TA4, the TA list may be included in the setup response message so that an RE may be informed thereof. Meanwhile, if the eMME does not support a mobile RE, a setup failure message having a cause field indicating that the eMME does not support a mobile RE may be transmitted to the RE.

In this case, RE#1 shown in FIG. 9A is pre-configured with an address of each eMME (e.g., an IP address), ID of each eMME, or a TA list managed by each eMME, or already have information on each eMME by receiving the information from the WBR. Therefore, RE#1 may determine a target eMME based on its own TA information for each eMME and the current area (e.g., TA#1).

In another example, in a case where RE#2 freely moves without a predetermined path, as illustrated in FIG. 9B, the setup request message shown in FIG. 8A may include a TA list which is set to be null. Then, the eMME may calculate a TA list for RE#2 and include the calculated TA list in a setup response message.

In this case, RE#2 shown in FIG. 9B already has an address of each eMME (e.g., an IP address of eMME#3), ID of each eMME, and a TA list managed by each eMME through WBR#7. Therefore, RE#2 may determine a \target eMME based on its own TA information for each eMME and the current area (e.g., TA#5).

In the above examples, if an RE receives a setup response message including a TA list, the RE may set the received TA list as Active Ta, and transmit information on the TA list to an UE via system information, such as a system information block (SIB).

Similarly, with the introduction of the WBR, it is necessary to add further elements to the update request message and an update response message, which are shown in FIG. 8A. For example, the update request message shown in FIG. 8C may include an element indicative of an RE moving direction (forward/reverse), and an element indicative of ID of a serving WBR.

Alternatively, with the introduction of WBRs, a serving eMME (which is eMME#1 in FIG. 9A, and eMME#3 in FIG. 9B) may determine whether it is necessary to change an eMME for a corresponding Re, based on a TA list sent by a mobile RE (which is RE#1 in FIG. 9A, and RE#2 in FIG. 9B) and the currently accessed WBR. Due to the change of an eMME, a GTP path for signaling between an additional eGW and an eMME may be changed. In this case, eGW may be changed as well. Detailed descriptions thereof will be provided with reference to FIGS. 11A and 11B.

Figure 10A:
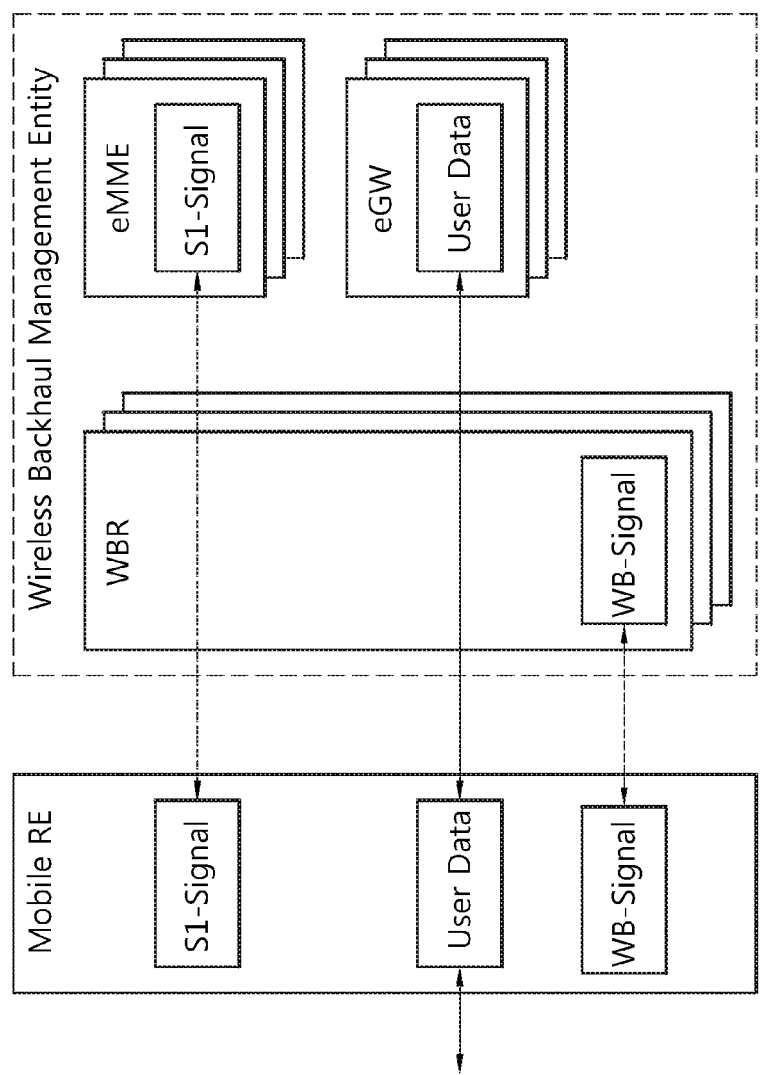
FIGS. 10A and 10B show concepts of a Wireless Backhaul Router (WBR) for a mobile RE.
Figure 10B:
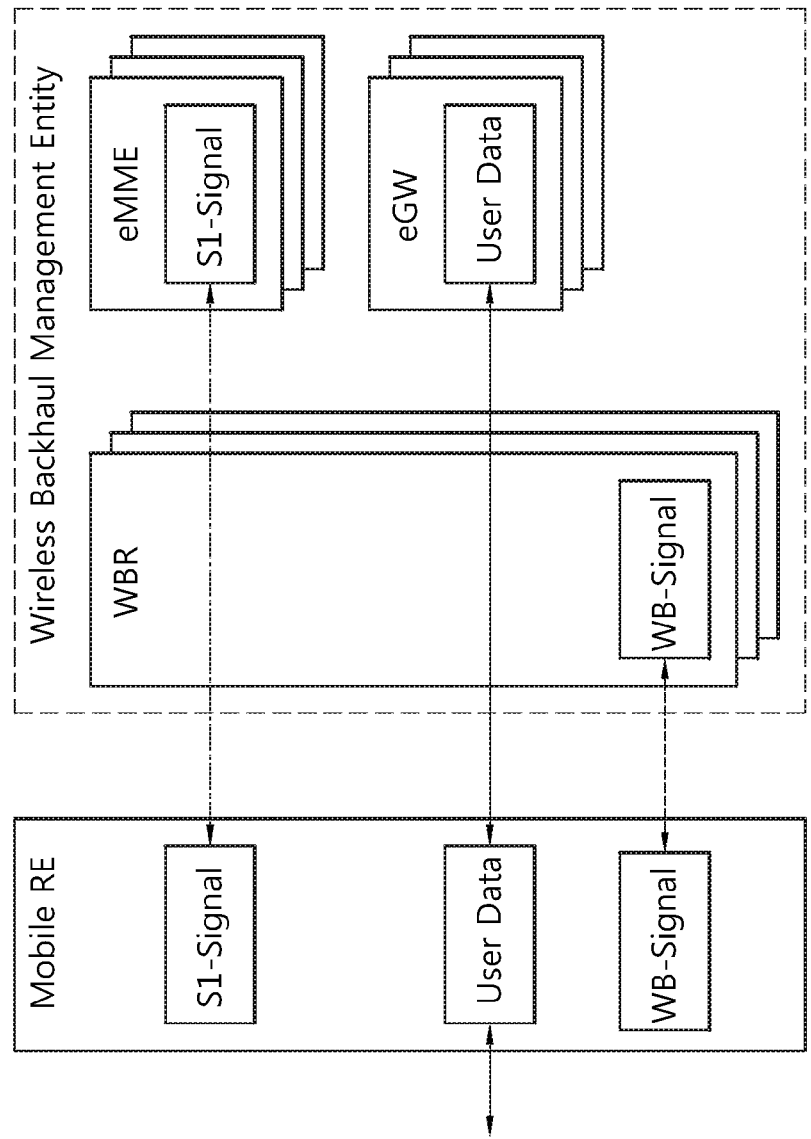

FIGS. 10A and 10B Show a Concept of a WBR for a Mobile RE.

A WBR shown in FIG. 10A may process only a wireless backhaul-related signal (that is, a WB-signal), transmit S1-signal in tact to an eMME, and transmit user data in tact to the eGW. That is, the WBR shown in FIG. 10A is able to amplify S1-signal and user data and transmit the amplified S1-signal to the eMME, and the amplified user data to the eGW.

Alternatively, a WBR shown in FIG. 10B may process a WB-signal, a S1-signal, and user data altogether. That is, the WBR shown in FIG. 10B may decode the S1-signal and user data, re-encode the decoded S1-signal and the decoded user data, and transmit the re-encoded S1-signal to an eMME, and the re-encoded user data to a eGW. For example, in the case of a S1-signal, RE#1 shown in FIG. 9A transmits a setup request message including a TA list to WBR#1, and then WBR#1 may determine a target eMME based on its own TA information for each eMME and the TA list included in the setup request message.

Figure 11A:
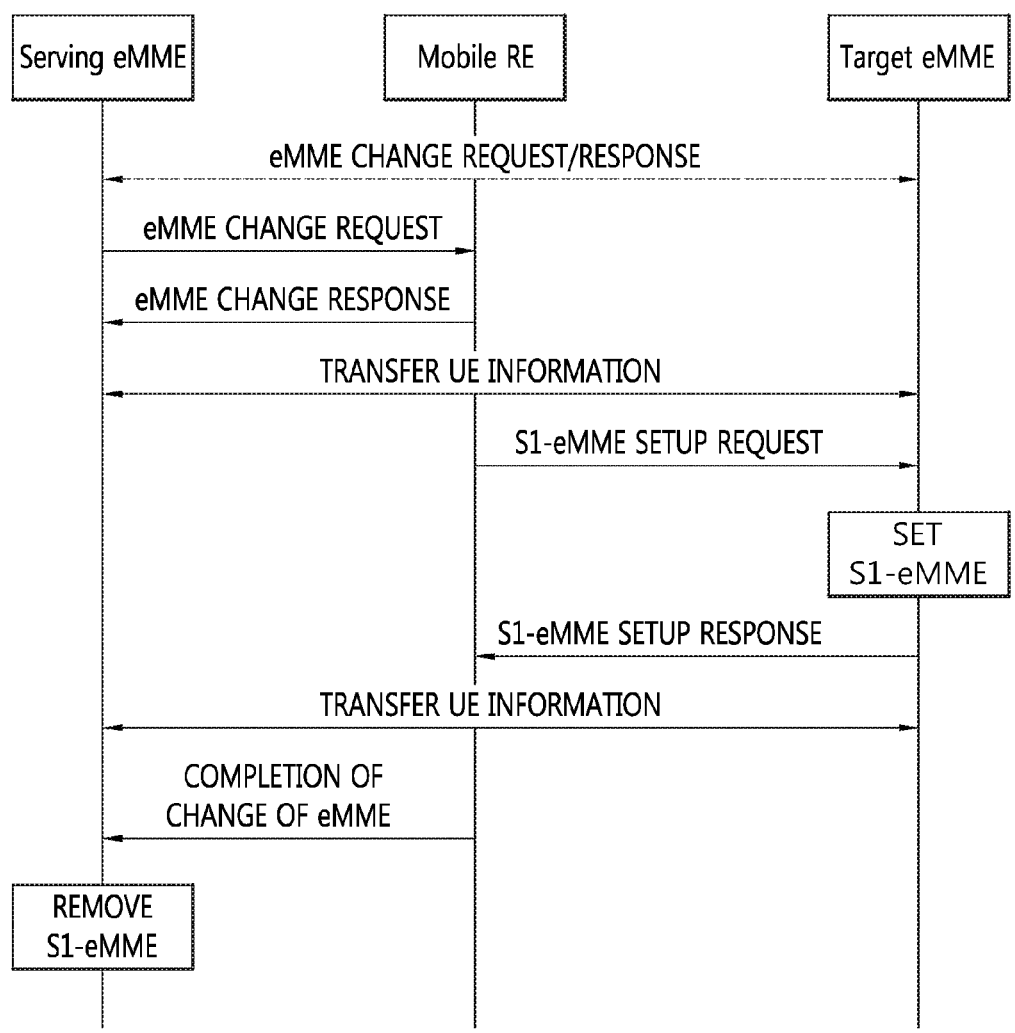
FIGS. 11A to 11B show examples of a procedure for changing a serving eMME.
Figure 11B:
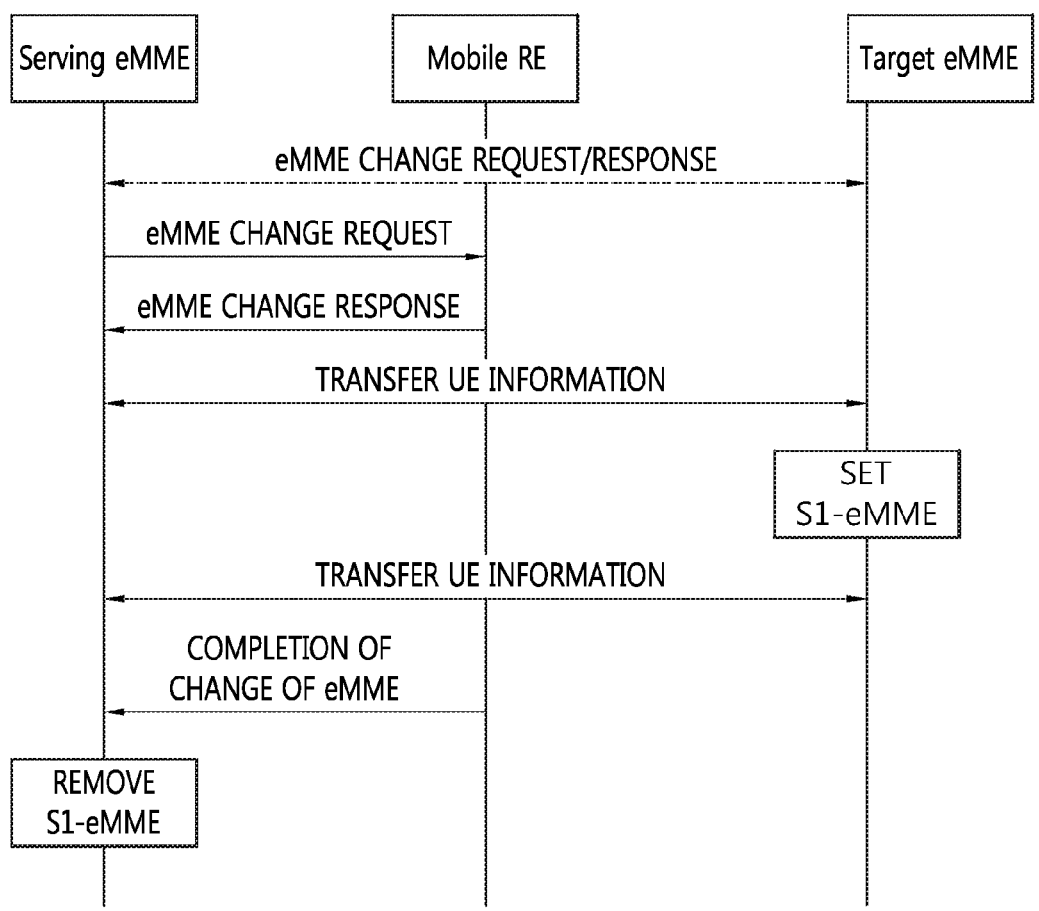

FIGS. 11A and 11B Show Examples of a Procedure of Changing a Serving eMME.

As noted with reference with FIG. 11A, an eMME change request/response message is transmitted and received between a serving eMME and a target eMME. Then, the serving eMME transmits an eMME change request message to an RE. The eMME change request message may include an address (e.g., an IP address) or ID of the target eMME, information as to whether to support information exchange between eMMEs, and information as to whether to change an eGW.

Then, the RE transmits an eMME change response message to the serving eMME.

Then, the serving eMME transmits information on the RE to the target eMME. The information on the RE may include ID, type information, and the like of the RE.

The RE transmits a S1-eMME setup request message to the target eMME. In response to the setup request message, the target eMME sets S1-eMME and then transmits a S1-eMME setup response message to the RE.

Then, the target eMME obtains information on an UE from the serving eMME.

If the RE transmits a eMME change completion message to the serving eMME, the serving eMME may cancel S1-eMME from the RE.

Meanwhile, as illustrated in FIG. 11B, the procedure of changing a serving eMME may be modified.

With reference to FIG. 11B, an eMME change request/response message is transmitted and received between a serving eMME and a target eMME. Then, the serving eMME transmits an eMME change notification message to an RE. The eMME change notification message may include an address (e.g., an IP address) or ID of the target eMME, information as to whether to support information exchange between eMMEs, and information as to whether to change an eGW.

Then, the RE transmits an eMME change response message to the serving eMME.

Then, the serving eMME transmits information on the RE to the target eMME. The information on the RE may include ID, type information, and the like of the RE.

Then, the target eMME sets up S1-eMME with the RE.

Then, the target eMME obtains information on an UE from the serving eMME.

If the serving eMME transmits an eMME change completion message to the RE, the serving eMME may cancel S1-eMME from the RE.

FIGS. 11A and 11B show examples of an eMME changing procedure performed by a serving eMME, but the procedure may be performed by an RE, Alternatively, the eMME changing procedure may be performed between an WBR and an eMME without an interruption of an RE.

The above-described embodiments may be implemented with various means.

For example, the embodiments of the present disclosure may be implemented by hardware, firmware, software, or a combination thereof. Detailed descriptions thereof will be provided with reference to FIG. 12.

Figure 12:
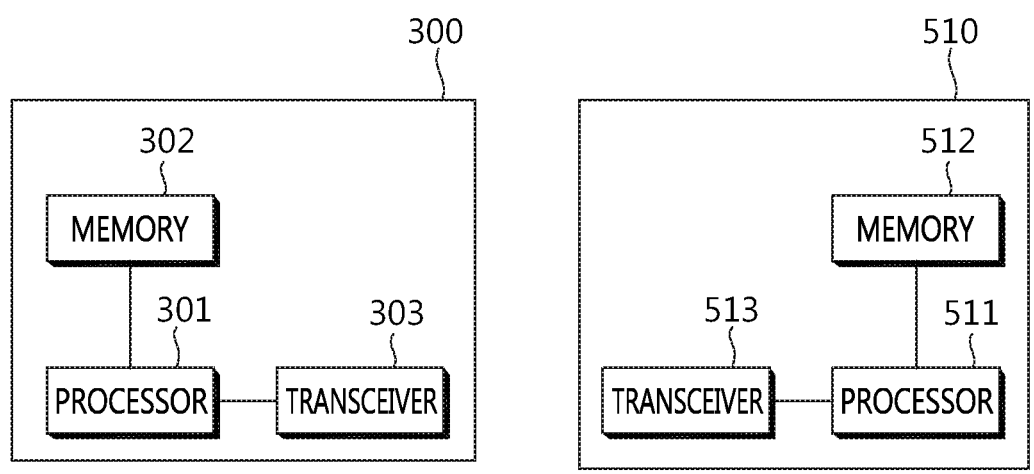
FIG. 12 is a block diagram illustrating the configuration of an RE and an eMME according to an embodiment of the present disclosure.

FIG. 12 is a Block Diagram Illustrating the Configuration of an RE and an eMME where an Embodiment of the Present Disclosure is Realized.

An RE 300 includes a processor 301, a memory 302, and a transceiver 303. The memory 302 is connected to the processor 301 to store various kinds of information necessary to drive the processor 301. The transceiver 303 is connected to the processor 301 to transmit and/or receive signals. The processor 301 performs functions, procedures, and/or methods proposed in the present disclosure. Operations performed by an RE in the above-described embodiments may be performed by the processor 301.

An eMME 501 may include a processor 511, a memory 512, and a transceiver 513. The memory 512 is connected to the processor 511 to store various kinds of information necessary to drive the processor 511. The transceiver 513 is connected to the processor 511 to transmit and/r receive signals. The processor 511 performs functions, procedures, and/or methods proposed in the present disclosure. Operations of an eMME in the above-described embodiments may be performed by the processor 511.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method for setting an interface between a mobility management entity (MME) and a radio entity (RE), the method comprising:
   transmitting, by the RE, an interface setup request message to the MME,
   wherein the MME provides one or more services to the RE using a cellular-based Radio Access Technology (RAT) and/or a Wireless Local Area Network (WLAN)-based RAT; and
   receiving, by the RE, an interface setup response message from the MME, and
   wherein the interface setup request message includes an identifier (ID) of the RE, type information of the RE, and information on mobility capability of the RE,
   wherein the type information of the RE indicates a specific type of RE among the following: a first type indicating only the cellular-based RAT, a second type indicating both of the cellular-based RAT and the WLAN-based RAT, a third type indicating the cellular-based RAT, and having an interface with a WLAN Access Point (AP), and a fourth type indicating both of the cellular-based RAT and the WLAN-based RAT, and having an interface for an external WLAN AP,
   wherein the interface setup response message includes an MME group ID or an MME code.

2. The method of claim 1, wherein, if the RE provides the WLAN-based RAT, the interface setup request message further includes one or more WLAN settings.

3. The method of claim 2, wherein the one or more WLAN settings comprise at least one of the following: information on a number of wireless APs managed by the RE, an index of a corresponding AP, and information on mobility capability of the corresponding AP.

4. The method of claim 3, wherein, if the interface setup request message is transmitted to update the one or more WLAN settings, the interface setup request message comprises an index of an AP to be updated, and updated information.

5. The method of claim 3, wherein the index of a corresponding AP is represented by a combination of ID of the corresponding AP and an attribute which indicates whether the corresponding AP is managed by a single wireless access device or a plurality of radio access devices.

6. The method of claim 1, wherein, if the information on mobility capability of the RE indicates that the RE is able to move, the interface setup request message further comprises information indicating that a moving direction is forward or reverse, and information of a Wireless Backhaul Router (WBR).

7. The method of claim 1, wherein if the information on mobility capability of the RE indicates that the RE is able to move, the interface setup request message further comprises a Tracking Area (TA) list.

8. The method of claim 1, wherein if the information on mobility capability of the RE indicates that the RE is able to move, the interface setup response message comprises a TA list generated by the MME.

9. The method of claim 8, wherein, if the interface setup response message comprises the TA list, the method further comprises broadcasting the TA list to one or more terminals via system information.

10. A wireless access device for providing one or more services to a radio entity (RE) using a cellular-based Radio Access Technology (RAT) and/or a Wireless Local Area Network (WLAN)-based RAT, the wireless access device comprising:
- a transceiver; and
- a controller configured to control the transceiver to transmit an interface setup request message to a mobility management entity (MME), and to receive an interface setup response message from the MME; and
- wherein the interface setup request message includes an identifier (ID) of the RE, type information of the RE, and information on mobility capability of the RE
- wherein the type information of the RE indicates a specific type of RE among the following: a first type indicating only the cellular-based RAT, a second type indicating both of the cellular-based RAT and the WLAN-based RAT, a third type indicating the cellular-based RAT, and having an interface with a WLAN Access Point (AP), and a fourth type indicating both of the cellular-based RAT and the WLAN-based RAT, and having an interface for an external WLAN AP,
- wherein the interface setup response message includes an MME group ID or an MME code.

11. The wireless access device of claim 10, wherein, if the RE provides the WLAN-based RAT, the interface setup request message further includes one or more WLAN settings.

12. The wireless access device of claim 11, wherein the one or more WLAN settings further comprises at least one of the following: information on a number of WLAN APs managed by the RE, an index of a corresponding AP, and information on mobility capability of the corresponding AP.

13. The wireless access device of claim 12, wherein, if the interface setup request message is transmitted to update the one or more WLAN settings, the interface setup request message comprises an index of an AP to be updated, and updated information.

14. The wireless access device of claim 12, wherein the index of a corresponding AP is represented by a combination of ID of the corresponding AP and an attribute which indicates that the corresponding AP is managed by a single wireless access device or a plurality of radio access devices.

* * * * *